(12) United States Patent
Portman et al.

(10) Patent No.: US 8,199,896 B2
(45) Date of Patent: Jun. 12, 2012

(54) SESSION BOARD CONTROLLER BASED POST CALL ROUTING FOR CUSTOMER FEEDBACK APPLICATION

(75) Inventors: Leon Portman, Rishon Lezion (IL); Shay Weiss, Ra'anana (IL); Hadas Liberman Ben-Ami, Netanya (IL); Uzi Baruch, Maale Adumim (IL); Beeri Mart, Hod HaSharon (IL); Offer Hassidi, Kiriat Ono (IL); Omri Hayner, Hogla (IL)

(73) Assignee: Nice Systems Ltd., Raanana (IL)

( * ) Notice: Subject to any disclaimer, the term of this patent is extended or adjusted under 35 U.S.C. 154(b) by 1056 days.

(21) Appl. No.: 12/125,088

(22) Filed: May 22, 2008

(65) Prior Publication Data

US 2009/0290701 A1    Nov. 26, 2009

(51) Int. Cl.
*H04M 3/42* (2006.01)
*H04M 3/00* (2006.01)

(52) U.S. Cl. ......... 379/212.01; 379/211.02; 379/213.01; 379/258; 379/265.06

(58) Field of Classification Search ............. 379/211.02, 379/212.01, 213.01, 265.02, 265.09, 258, 379/265.06, 265.13
See application file for complete search history.

(56) References Cited

U.S. PATENT DOCUMENTS

| | | | |
|---|---|---|---|
| 7,577,246 B2 * | 8/2009 | Idan et al. ................ 379/265.01 |
| 7,672,444 B2 * | 3/2010 | Perrella et al. ........... 379/265.02 |
| 2004/0098265 A1 * | 5/2004 | Kelly et al. .................... 704/270 |
| 2005/0100158 A1 * | 5/2005 | Kreiner et al. ........... 379/265.02 |
| 2005/0286709 A1 * | 12/2005 | Horton et al. ............ 379/265.09 |
| 2006/0062374 A1 * | 3/2006 | Gupta ....................... 379/265.06 |
| 2006/0073786 A1 * | 4/2006 | Sarkar ............................ 455/24 |
| 2007/0127693 A1 * | 6/2007 | D'Ambrosio et al. ... 379/265.06 |
| 2007/0127694 A1 * | 6/2007 | Hajj et al. ................ 379/265.06 |
| 2007/0248221 A1 * | 10/2007 | Chatterjee et al. ....... 379/211.02 |
| 2007/0269038 A1 * | 11/2007 | Gonen et al. ............. 379/265.02 |
| 2008/0130495 A1 * | 6/2008 | Dos Remedios et al. ..... 370/230 |
| 2008/0215445 A1 * | 9/2008 | Horton et al. ................... 705/14 |
| 2008/0267386 A1 * | 10/2008 | Cooper .................... 379/265.06 |
| 2009/0003583 A1 * | 1/2009 | Carretto et al. .......... 379/265.06 |
| 2009/0168989 A1 * | 7/2009 | Perlmutter ............... 379/265.09 |
| 2009/0202057 A1 * | 8/2009 | Tartarelli et al. ......... 379/142.04 |
| 2009/0234965 A1 * | 9/2009 | Viveganandhan et al. .... 709/231 |
| 2009/0274289 A1 * | 11/2009 | Bloch ...................... 379/265.06 |
| 2010/0104087 A1 * | 4/2010 | Byrd et al. ............... 379/265.09 |
| 2010/0161315 A1 * | 6/2010 | Melamed et al. ................ 704/9 |
| 2010/0332287 A1 * | 12/2010 | Gates et al. ..................... 705/10 |

* cited by examiner

*Primary Examiner* — Lisa Hashem
(74) *Attorney, Agent, or Firm* — Pearl Cohen Zedek Latzer, LLP

(57) ABSTRACT

Embodiments of the invention include a method for handling communication sessions by a central gateway, such as session border controller. The method may include receiving an indication that the interaction between a customer and an agent has ended and automatically routing by the session border controller the customer to an automated feedback application.

13 Claims, 2 Drawing Sheets

SESSION BOARD CONTROLLER BASED POST CALL ROUTING FOR CUSTOMER FEEDBACK APPLICATION

BACKGROUND

Increasing customer satisfaction is a major goal of modern contact centers and other interaction-related environments such as, for example, banks, academic institutions, telephone companies (Telco's) e.g., an inter-exchange carrier or a local exchange carrier and/or government agencies.

The assessment of customer satisfaction in relation to customer-agent telephone interaction may be obtained from a feedback application implemented on an IVR-based survey system. There is a need for a feedback application implementation that would enable transferring customers to the feedback survey system upon termination of the interaction with the contact center representative in an efficient and reliable manner.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
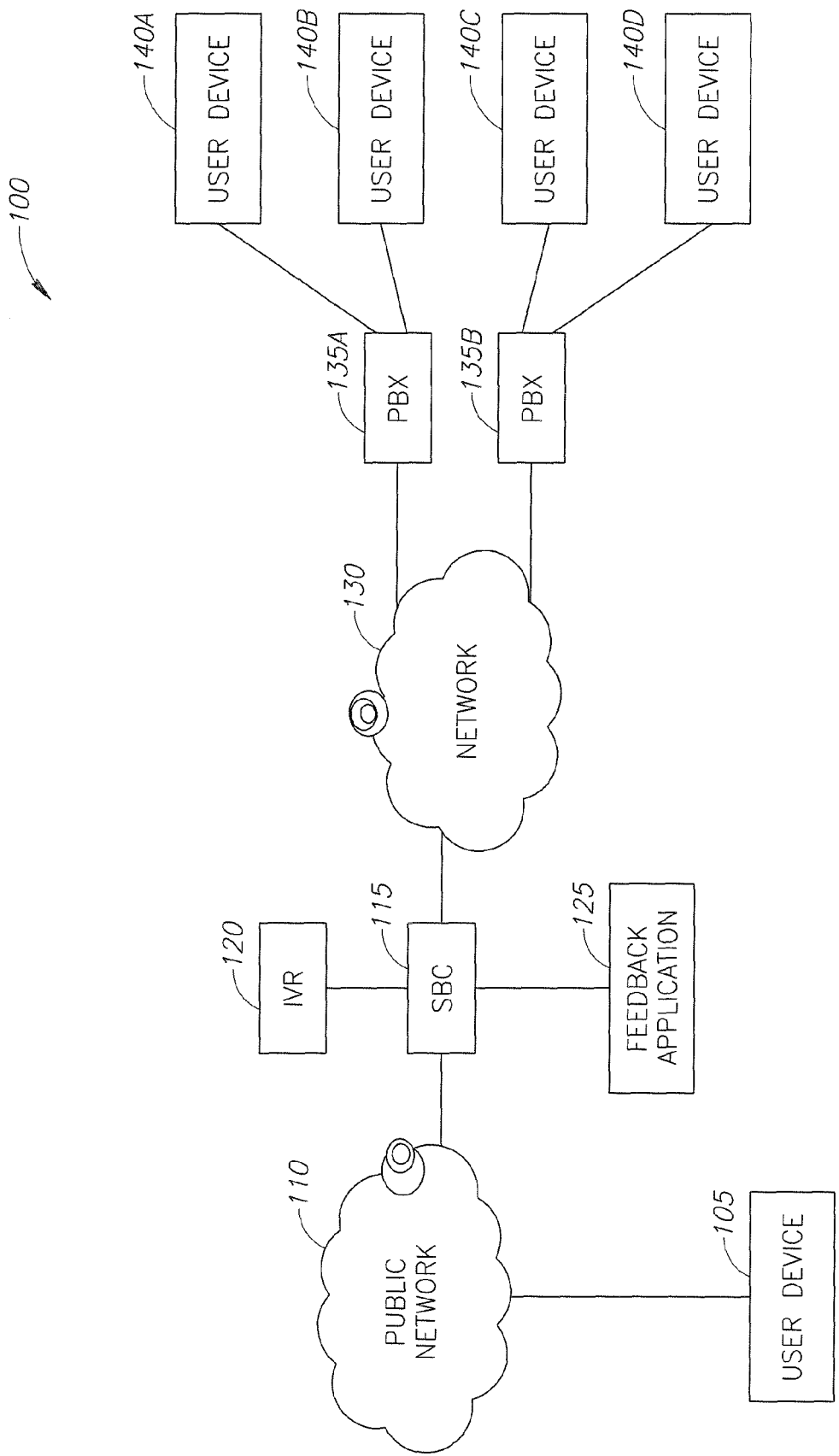
FIG. 1 shows an exemplary high-level diagram of exemplary components according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time.

The term "session" used in this patent application specification should be expansively and broadly construed to include any configuration, setup, or other aspects of hardware, firmware, software and/or nay combination thereof that may enable entities to exchange content or otherwise interact over any layer according to the OSI seven layer model (as defined by the open system interconnect (OSI) initiative). Accordingly, a session may enable two or more humans to exchange voice information, namely, talk. A session may further enable a human to exchange content with a computer application entity or, alternatively, enable two computer applications to exchange information and/or content. For example, an established, capable of transmitting information, transmission control protocol (TCP) connection between two computers may be regarded as a session. Such a session may enable application entities to exchange content. Another example of a session may be a set of configurations, conditions, software applications and hardware enabling a telephone conversation to take place between two humans, a video stream to be communicated from an application on a first computing device to an application on a second computing device, a web session etc.

Information and/or content exchanged over a session may be of various types, nature or form. For example, information and/or content exchanged over a session may comprise a file, a video clip, a conversation or any other form and/or type of applicable information and/or content. According to embodiments of the invention, a session may be associated with a specific application or a group of applications. For example, a session may be associated with video or other multimedia streaming applications. Such a session may communicate multimedia data as well as possibly signaling information. Another exemplary session may be associated with instant messaging (IM) applications, possibly executing on two or more computers, and may accordingly communicate data, content or other information exchanged between such applications.

A session may last a short period of time, e.g., a few seconds or a substantial period of time, e.g., hours or days. A session may involve one or more network connections, e.g., a number of transmission control protocol (TCP) or user datagram protocol (UDP) connections may be associated with a single session. A session may further involve many computing devices, for example a session may involve a first computer, a private branch exchange (PBX) and a second computer. A session may involve various entities such as, but not limited to, computing devices, switching devices, routing devices, computer applications and humans. For example, a session may involve a first human, e.g. a client, possibly operating a telephone, one or more computing devices that may perform various administrative or other functions, one or more switching devices that may perform switching of information between various communication facilities, and a second human, e.g. an agent, either operating a second computer or using a second telephone in order to participate in the session.

Alternative configurations may further affect various aspects associated with a session, such as, for example, operational aspects, control aspects etc. For example, an entity may apply an appropriate configuration such as to enable it to participate in a session originally established between two other entities. For example, joining a conference call. Another example of manipulating a session may be where a first entity associated with a session with which a second entity is also associated may enable a third entity to participate in the session, for example, by providing the third entity with required configuration information (e.g. TCP or UDP port numbers or SIP parameters) and by further routing packets associated with the session to the third entity.

The term "call" as used in the specification and claims should be expansively and broadly construed to comprise any capabilities, attributes, parameters and/or any other applicable aspects that may be associated with a session as defined above. According to embodiments of the invention, an exemplary call may communicate sound, human voice, dual-tone multi-frequency (DTMF) (a mechanism for sending simple alphanumeric data over an audio path) and/or other information related to voice. For example, a conversation between a customer and an agent in a call center may be regarded as a call according to this patent application specification. The terms call and session may be used interchangeably in this patent application specification.

The terms "customer", "user" and/or "caller" as used in the specification and claims should be expansively and broadly construed to include any entity interacting over a session or otherwise associated with a session. For example, a customer may be a customer of a bank interacting with a bank's facility, a student interacting with an academic institution and a customer interacting with a representative of a service contact center. The terms customer, user and/or caller may be used interchangeably throughout the specification.

The term "contact center" as referred to in the specification and claims should be expansively and broadly construed to include any customer interaction center that includes at least one call center for handling telephone calls. Further, the contact center my handle other types of customer interaction sessions, such as e-mails, Web site inquiries, video sessions and instant signaling messages.

Embodiments of the invention are directed to obtaining feedback from customers in relation to a session, for example, after the termination of the interaction of the customer with a representative of a contact center. According to embodiments of the invention, a gateway such as a session border controller (SBC) may transfer an incoming call or session to an integrated voice response (IVR) based survey system. The IVR system may interact with the caller and may obtain the user's consent to participate in a feedback session. Assuming the consent is obtained and/or other conditions and/or prerequisites are met, the call or session may be tagged.

Such tagging may be used by a gateway such as a SBC to forward the session or call to a feedback application or system, possibly at a later stage. For example, the call or session may be forwarded or transferred by an SBC or a gateway to a private branch exchange (PBX) which in turn may forward the call or session to an agent station. Upon receiving an indication that the interaction between the customer and the agent has terminated, the SBC or gateway, possibly based on a tag associated with the session or call, may transfer the call to a feedback application.

According to embodiments of the invention, eligibility of a call or session to include a feedback stage or phase may further include determining that predefined conditions are met. For example, a call may be eligible for a feedback stage only if it arrives from a set of predefined call areas, or only if it is a first call from a particular or source phone number. Alternatively or additionally, a predefined relative portion of all incoming calls, for example twenty percent (20%) of incoming calls or sessions may be randomly selected for a feedback session. According to some embodiments of the invention, in addition to meeting prerequisites such as described above, the caller must further specifically provide his consent to participate in a feedback session. For example, according to some embodiments of the invention, calls or sessions that meet conditions and/or prerequisites as described above may be forwarded to an IVR application whereby the caller may provide his consent to participate in a feedback session.

Reference is made to FIG. 1 depicting a high-level diagram of an exemplary contact center environment according to embodiments of the invention. According to embodiments of the invention, a contact center environment, denoted system 100 may be coupled to a network 110 such as a public telephone network or any other network capable of transmitting telephone calls or sessions from customer devices such as user device 105 to system 100. System 100 may include session border controller (SBC) 115 serving as a gateway to and from the contact center environment. Alternatively, according to some embodiments of system 100 may include a gateway such as Ingress/egress gateways.

It will be recognized that wherever a session border controller is referred to hereinafter, a gateway or any other suitable device may be used without departing from the scope of the invention. Although the description below refers to a session border controller, it will be understood that such reference is made as an example to one of a number of possible embodiments of the invention.

System 100 may further comprise an IVR-based survey system 120 coupled to SBC 115. An IVR application or system may interact with a caller. For example, IVR 120 may provide multiple-choice questions to which a customer may respond by pressing the appropriate key(s) on the phone pad or keyboard. System 100 may further comprise a feedback application 125.

A customer feedback application may utilize interactive voice response (IVR) technology to gather information from customers. A customer feedback application may conduct surveys by presenting questions to customers and may further store and/or analyze customers' answers or responses. The results of such surveys may provide information from customers concerning agents, products, campaigns, advertisements etc. These results, together with other data on the system, may be utilized to provide a multi-dimensional analysis of how the customer sees the organization, and what can be done to improve the customer experience, reduce customer loss and improve up-sell and cross-sell techniques and results.

A feedback session may be conducted after a call or session has completed, for example, after a customer finished talking to an agent. Alternatively, a feedback session may be conducted prior to an interaction with an agent or other entity in a contact center. For example, a feedback web page may be presented prior to a presentation of a main web page. According to embodiments of the invention, a feedback session may be conducted for either incoming calls or sessions and/or out going, or out bound calls or sessions. For example, a feedback may be requested from a customer after a call initiated by an agent in a contact center terminates or a feedback may be solicited from a customer upon a termination of a session or call initiated by the customer.

The System may further include one or more applications, for example, a recording application, a management application, a security application or any other applicable application. Such applications may be operatively connected to any other application, module or entity.

System 100 may further comprise one or more switches, such as private branch exchanges (PBX) 135A, 135B, where each may be associated with a plurality of agent stations, such as telephones 140A-140D and a network 130, such as TCP/IP or multi-protocol label switching (MPLS) network, coupled to SBC 115 and switches 135A, 135B. Session border controller 115 may receive telephone calls from network 110 and forward the calls to one of switches 135A or 135B or directly to one of the users' devices. It should be understood to a person skilled in the art that although only two switches and four agent stations are illustrated for sake of clarity, embodiments of the invention are not limited in that respect and the number of switches and agent stations may be any suitable number.

System 100 may enable customers to interact in one continuing session controlled by SBC 115 with different components of the contact center, for example, with IVR system 120, feedback application 125 one or more agents 140A-D. According to embodiments of the invention, a customer may connect to system 100 over network 110. Then, SBC 115 may forward the incoming call or session, for example, to PBX 135A to be handled by agent station 140A. Alternatively, according to some embodiments of the invention, SBC 115 may forward the session to the agent station. Prior to transferring the call or session to PBX 135A, the call or session may be forwarded by gateway 115 to IVR 120 to determine whether the call or session is eligible to be forwarded to a customer feedback application. Upon termination of the interaction between the customer and the agent associated with agent station 140A, the session may be transferred or forwarded by gateway 115 to feedback application 125 thus enabling the customer to participate in the feedback survey. It will be noted that a session, as described above may be or may include a telephone call, a web session, a video or audio stream, any multimedia content or any applicable information or content that may be exchanged between a customer or other entity and a contact center.

According to embodiments of the invention, network 110 may be a public switched telephone network (PSTN), or any other suitable telephone network. Alternatively or additionally, network 110 may be a local area network (LAN), a private IP network, or it may comprise integrated services digital network (ISDN) lines, T1/E1 lines and support, DS1 and/or DS3 lines and support, support for Asynchronous Transfer Mode (ATM) communications, frame relay connections, metropolitan area network (MAN), a wide area network (WAN), a global computer network such as the internet, a wireline or wireless network, a local, regional, or global communication network, an enterprise intranet, other suitable communication link, or any combination of the preceding.

Gateway 115 may serve as a gateway for both signaling and media data of Voice over Internet (VoIP) sessions or Video sessions. Gateway 115 may support SIP, H.323 and MGCP as signaling protocols and RTP as media transport protocol. Integrated voice response (IVR) system 120 may utilize any suitable IVR application. It will be recognized that embodiments of the invention are not limited to a specific type, brand or other aspects of IVR 120. According to embodiments of the invention, feedback application 125 may be implemented in software, possibly installed on computers, or it may be firmware embedded in hardware or implemented in any other applicable manner.

According to embodiments of the invention, feedback application 125 may interact with a customer to obtain, log and/or possibly process feedback information. Feedback application 125 may further record, store, report, analyze and/or otherwise manipulate feedback information. According to embodiments of the invention, private branch exchanges (PBX's) 135A, 135B may be any suitable PBX. It will be recognized that embodiments of the invention are not limited to a specific type, brand or other aspects of PBX 135.

Figure 2:
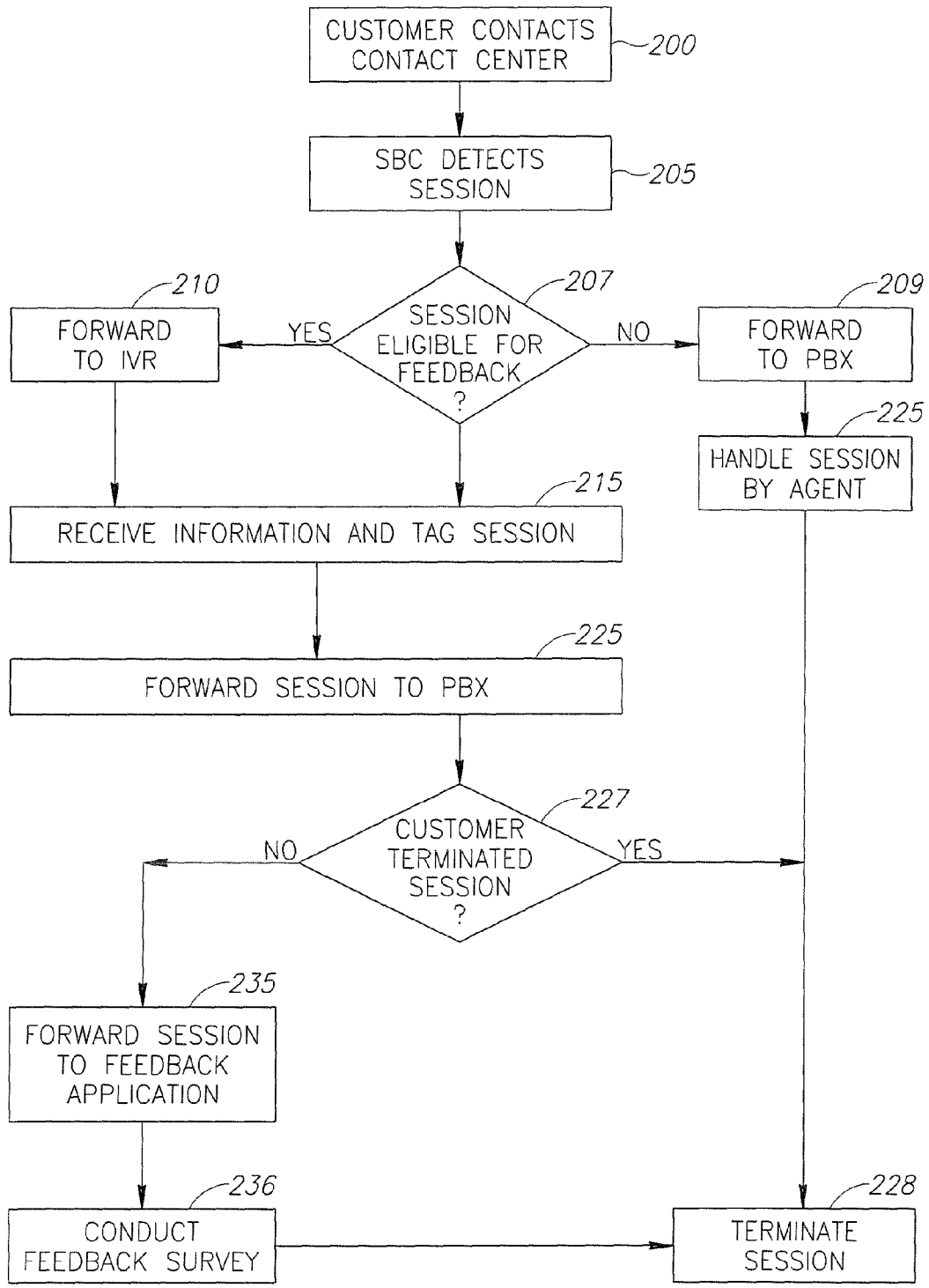
FIG. 2 shows an exemplary flow of obtaining a customer feedback according to some embodiments of the invention.

Reference is made to FIG. 2 showing an exemplary method of obtaining post-call customer feedback utilizing IVR surveying technology according to some embodiments of the invention. The method may include transferring the customer, in a continuous session, to an automated survey system, once the interaction with the agent is completed. The session may be an incoming call, when a customer calls a contact center or alternatively an outgoing call when a representative of the contact center calls a customer. The session may be a web session, e.g., a session connecting two or more computers, for example, a user computing device and a web server. In the description below, for ease of explanation the call flow of an incoming call is described.

It will be recognized that although the exemplary flow described below refers to automatic routing by a session border of a customer participating in a call to a feedback application, embodiments of the invention may be applicable to automatic routing and flow control of sessions and telephone calls to other applications or destinations.

According to embodiments of the invention, a customer may initiate a session by calling or otherwise contacting a contact center (block 200). The session or call may be detected by a gateway, for example Session border controller 115 (block 205). For example, SBC 115 may transfer or route an incoming or outgoing session or call to any applicable application or destination. The forwarding or transferring of the call may be performed by gateway 115 according to a well defined scheme and/or protocol, for example, session initiation protocol (SIP). SBC 115 may store information pertaining to the call or session. For example, SBC 115 may store information that may uniquely identify the call or session. The unique identification may be a phone number associated with the call or an internet protocol (IP) network address of a computing device originating the session.

Further, SBC 115 may store a set of predetermined rules regarding the eligibility of sessions for post-call feedback. The rules may be statistical rules or rules related to the characteristics of the specific session or customer. SBC 115 may determine if the session is eligible for the after-call survey (block 207) and if so may automatically transfer the session (block 210) to the automated survey system, for example to IVR system 120 of FIG. 1 where the customer may be prompted to agree to participate in an after-call feedback survey.

When SBC 115 determines that the session is not intended for post-call feedback session, the session may be forwarded by SBC 115 to its destination, for example to one of PBX's 135A, 135B, 135C or 135D and to one of the agents to handle the customer inquiry (block 209).

For sessions eligible for post-call feedback, the information received by survey system 120 from the customer, such as the customer's consent to participate in the after-call survey may be delivered to SBC 115. According to embodiments of the invention, the information received from IVR 120 may comprise a tag or any other identification information that may be used by SBC 115 to identify the call at later stages of the flow. Accordingly, the call may be tagged by SBC 115 as eligible for the after-call survey or alternatively may be handled as a regular call (block 215). Further, IVR system may send an indication, according to any suitable protocol or scheme, to SBC 115 that the interaction of the caller with the IVR application has terminated. Alternatively, according to some embodiments, if the session is determined to be eligible for post-call feedback, the session may be tagged accordingly without first receiving a customer's consent.

Then, according to some embodiments, SBC 115 may forward the call over network 130 to a telephone switch, such as PBX 135A or directly to an agent. PBX 135A may route the call to an agent to interact with the customer (block 225). According to embodiments of the invention, for sessions tagged as eligible for post-call survey, SBC 115 may receive an indication that the interaction between an agent and the customer has terminated and may determine whether the agent or the customer hung up (block 227). For example, PBX 135 may detect an event such as, but not limited to, a telephone state changing from off-hook to on-hook.

According to embodiments of the invention, PBX 135 may, upon detecting an appropriate event, notify SBC 115 that the interaction between an agent and a caller has ended, for example by communicating a PBX BYE message associated with the call. If SBC 115 detects that the customer hung up, then the session is terminated as the customer did not wait on line after the call (block 228). If SBC 115 detects that the agent disconnected at the end of the interaction with the customer, the customer may be automatically routed by SBC 115 to customer feedback application (block 235) where the automated feedback survey will be conducted (block 236).

According to embodiments of the invention and as shown by block 235, the method may include forwarding a call or session to a feedback application. For example, SBC 115 may forward a call to a customer feedback application 125. Forwarding the call may be performed by SBC 115 according to a well defined scheme and/or protocol. For example, session initiation protocol (SIP) may be used by SBC 115, feedback application 125 and possibly additional components in order to facilitate forwarding of a call or session.

The customer feedback application may produce reports according to pre-defined report templates based on survey results. Upon receiving an indication that the customer's interaction with the feedback application has ended, the call or session may be terminated by SBC 115.

Further, according to embodiments of the invention, a gateway or session border controller may select one or more destinations such as computing devices, applications or humans to be associated with a session. The session border controller may be configured to plan ahead routing of the session via more that one destination according to predefined policies, rules or parameters.

For example, a policy may address time aspects and may, accordingly, define time-related rules such as forward calls from area code "A" to an IVR application and then to agent "B" during day time but forwards such calls directly to agent "C" during night time. Another exemplary policy may address a content aspect of a session, e.g., forward sessions associated with multimedia to a recording system. Another policy may address customers or client aspects, e.g., forward web sessions associated with known customers or clients to a specific web site. According to embodiments of the invention, any applicable criteria may be used by gateway 115 in order to select entities to be associated with a session.

For example, a session involving a computing device located outside a contact center may be forwarded to a specific server inside the contact center, upon receiving a pre-defined indication from the server, a SBC may forward the session to a second computer or server. Alternatively, a session may be forwarded according to scheduling parameters. For example, a web session may be forwarded to a first server that may present a user with a welcome page and special offers of the day, after a predefined period of time is allowed to elapse, the session may be forwarded to another server, possibly the server the user initially meant to interact with. According to embodiments of the invention, such routing, forwarding or otherwise coupling a user, application or any suitable entity with an application or server in a contact center may be performed during any time the session is established. For example, before a customer talks to an agent, after a customer talks to an agent, before a web session is routed to the requested server or after the interaction with a web server is terminated.

According to embodiments of the invention, methods, procedures, functions and/or operations described above may be performed by an apparatus, device, machine or any other suitable equipment. For example, a computing device equipped with suitable hardware and/or firmware components and further executing one or more programs, applications, scripts and/or any suitable software code and digital information may perform methods, procedures, functions and/or operations described above. Such software may further be divided to modules. For example, a first module may handle network connectivity and network management, a second module may handle a decision making process, for example, deciding or determining whether a session is eligible for routing or forwarding to a feedback application, a third module may handle tagging of sessions etc.

Some embodiments of the present invention may be implemented in software for execution by a processor-based system e.g. SBC 115, as shown in FIG. 1. For example, embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Such system may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method for handling communication sessions comprising:
   detecting by a session border controller a communication session;
   receiving by the session border controller an indication that a customer-service interaction associated with the communication session has been ended;

tagging the communication session as eligible for being transferred to a feedback application according to rules stored in the session border controller; and transferring the communication session by the session border controller to the feedback application.

2. The method of claim 1, wherein the communication session is a telephone call and further comprising:

forwarding the telephone call from the session border controller to a telephone switch to establish the customer-service interaction.

3. The method of claim 2 comprising:

prior to forwarding the telephone call to the telephone switch, forwarding the telephone call from the session border controller to an integrated voice response server to receive a customer's consent to participate in an after-call survey handled by the feedback application; and wherein tagging the communication session as eligible for being transferred to the feedback application is based on results from the integrated voice response server.

4. The method of claim 1, wherein transferring the communication session to the feedback application comprises connecting a customer to an automated survey of customer feedback.

5. The method of claim 1, wherein receiving the indication that the customer-service interaction has been ended comprises receiving information that a customer-service representative has left the session.

6. The method of claim 1, wherein the indication of a termination of interaction is a PBX BYE message.

7. A system for handling communication sessions, the system comprising:

a session border controller coupled to a communication network to detect a communication session; and an automated customer feedback application coupled to the session border controller via the communication network, wherein the session border controller is to tag the communication session as eligible for being transferred to the feedback application according to rules stored in the session border controller and to transfer the communication session to the feedback application upon receipt of an indication that a customer-service interaction of the communication session has been ended.

8. The system of claim 7 further comprising:

a telephone switch to receive the communication session as a telephone call from the session border controller for establishing the customer-service interaction.

9. An article of manufacture comprising a non-transitory computer-storage medium having stored thereon instructions that, when executed by a processing platform, result in:

detecting a communication session;

receiving an indication that a customer-service interaction associated with the communication session has been ended;

tagging the communication session as eligible for being transferred to a feedback application according to rules stored in the article; and transferring the communication session to the feedback application.

10. The article of claim 9, wherein the communication session is a telephone call and wherein the instructions when executed further result in:

forwarding the telephone call to a telephone switch to establish a customer-service interaction.

11. The article of claim 10, wherein the instructions when executed further result in:

prior to forwarding the telephone call to the telephone switch, forwarding the telephone call to an integrated voice response server to receive a customer's consent to participate in an after-call survey handled by a feedback application; and wherein tagging the communication session as eligible for being transferred to the feedback application is based on results from the integrated voice response server.

12. The article of claim 9, wherein transferring the communication session to the feedback application comprises connecting a customer to an automated survey of customer feedback.

13. The article of claim 9, wherein receiving the indication that the customer-service interaction has been ended comprises receiving information that a customer-service representative has left the session.

* * * * *